(12) United States Patent
Morinaga et al.

(10) Patent No.: US 7,760,134 B2
(45) Date of Patent: Jul. 20, 2010

(54) RADAR APPARATUS AND METHOD OF MEASURING AZIMUTH ANGLE OF TARGET

(75) Inventors: Mitsutoshi Morinaga, Hachioji (JP); Hiroto Mitoma, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 54 days.

(21) Appl. No.: 12/314,578

(22) Filed: Dec. 12, 2008

(65) Prior Publication Data

US 2009/0153395 A1 Jun. 18, 2009

(30) Foreign Application Priority Data

Dec. 14, 2007 (JP) ............... 2007-323068

(51) Int. Cl.
*G01S 13/00* (2006.01)
(52) U.S. Cl. .............. 342/175; 342/113; 342/146; 342/147
(58) Field of Classification Search ............. 342/113, 342/146, 147, 175
See application file for complete search history.

(56) References Cited

U.S. PATENT DOCUMENTS 2,991,463 A * 7/1961 Lakatos et al. ............ 342/29
5,291,207 A 3/1994 Kikuchi et al.
7,224,717 B1 * 5/2007 Lam et al. ............... 375/144
2004/0252047 A1 12/2004 Miyake et al.
2005/0225481 A1 10/2005 Bonthron
2006/0028375 A1 2/2006 Honda et al.
2006/0114146 A1 6/2006 Lindenmeier et al.

FOREIGN PATENT DOCUMENTS

| DE | 19912370 A1 | 3/1999 |
| EP | 0777133 A1 | 11/1996 |
| JP | 05-180933 | 12/1991 |
| JP | 2004-132734 | 10/2002 |
| JP | 2004-239744 | 2/2003 |
| JP | 2005-043375 | 9/2004 |

* cited by examiner

*Primary Examiner*—Thomas H Tarcza
*Assistant Examiner*—Timothy A Brainard
(74) *Attorney, Agent, or Firm*—Stites & Harbison PLLC; Juan Carlos A. Marquez, Esq.

(57) ABSTRACT

A radar apparatus capable of determining the position of targets at a high accuracy even when plural objects of an identical relative velocity are present in a detection view field of the radar, using signal processing of obtaining an effect which is similar with that of virtually increasing the number of antennas along the moving direction of the radar by determining the change of intensity of reception signals using data in the past in which an identical antenna was positioned at a slightly different place (T1) and data at present (T1+ΔT) as a unit data set.

20 Claims, 16 Drawing Sheets

TIME: Ti

TIME: Ti+ΔT

RADAR APPARATUS AND METHOD OF MEASURING AZIMUTH ANGLE OF TARGET

CLAIM OF PRIORITY

The present application claims priority from Japanese Patent Application 2007-323068 filed on Dec. 14, 2007, the content of which is hereby incorporated by reference into this application.

FIELD OF THE INVENTION

The present invention concerns a radar apparatus for detecting an obstacle by using continuous electric waves and a method of measuring the azimuth angle of a target and it particularly concerns an automobile-mounted radar apparatus for measuring the position of a body to be detected and a relative velocity to an one's own automobile at a high accuracy and a method of measuring the azimuth angle of the target.

BACKGROUND OF THE INVENTION

A method of measuring an azimuth angle of a target to be detected (object to be detected) by using a radar apparatus includes several systems. Typical systems include, for example, a scanning system disclosed, for example, in JP-A No. 2004-132734 and a mono-pulse system disclosed, for example, in JP-A No. 2004-239744.

The principle of the scanning system disclosed in JP-A No.2004-132734 is to be described with reference to FIG. 14.

FIG. 14 shows an example of a radar antenna 300 and a radiation beam pattern 302 generated by the antenna. As shown in the drawing, the beam pattern is restricted finely by combining antenna elements in plurality in the lateral direction and the radiation beam is deflected right and left. In the radar, the intensity of electric waves when emitted electric waves are returned by reflection at a target is measured, and it can be seen that the target is present in the direction of the azimuth angle with strong reception intensity.

Then, JP-A No.2004-239744 discloses a radar structure of a mono-pulse system, that is, having an antenna including one transmission antenna and two reception antenna (left) and reception antenna (right) disposed being opposed to each other, that is, at positions right and left to each other.

On the other hand, JP-A No.2005-43375 discloses an automobile periphery monitoring device capable of efficiently tracking an object even when the number of detection points increases by widening of the angle and increasing of the sensitivity. That is, the automobile periphery monitor device of JP-A No.2005-43375 includes an object position estimation device for estimating a position to be detected at present based on an object position data in the past for each of the objects detected in the past, a window setting device of providing a predetermined window around the estimation position of the object, and an object tracking device of determining object position data at present by using detection point data contained in the window and calculating a relative velocity of the object by using object position data detected in the past.

Further, JP-A No. H05-180933 discloses a method of estimating the position of a target obstacle in an automobile improved for the position estimation accuracy of a target obstacle. That is, the position estimation method of JP-A No. H05-180933 labels each obstacle data so as to affix an identical label to obstacle data close to each other on an ordinate, calculates the moving direction and the moving amount on every label based on data in the last time and the data at present, divides the moving amount by a sampling time to calculate a relative velocity on every label relative to one's own automobile, and estimates the position of the target obstacle after a predetermined time based on a relative velocity vector which is determined by the relative velocity and the moving direction.

SUMMARY OF THE INVENTION

For measuring a distance to an obstacle or an automobile running in front, and an azimuth angle during running of an automobile, radar apparatus utilizing millimeter waves have been utilized generally. The radar apparatus emits electric waves and receives reflection waves from an object such as an obstacle or an automobile running in front. Then, it detects the intensity of received reflection waves, Doppler shift of frequency, propagation time from the emission of electric waves to the reception of reflection waves and measures a distance to the object, a relative velocity, etc. based on the result. In recent years, constant velocity running apparatus and automobile distance control apparatus of mounting such a radar apparatus is mounted on an automobile, and detecting an obstacle or an automobile in front and conducting control operation based on the result have been put to practical use.

The scanning system disclosed in JP-A No.2004-132734 involves the following two problems. At first, since the area of an antenna is enlarged for finely restricting the emission beam, it is difficult to decrease the size of an entire radar apparatus. Secondly, since a mechanical operation section is required for moving the antenna portion of a radar right and left, it is difficult to ensure long time reliability.

Then, the principle of the mono-pulse system adopted in JP-A No. 2004-239744 is to be described with reference to FIGS. 15A, 15B, 16A, and 16B. At first, FIG. 15A is a view showing a constitutional example of an antenna. Each antenna is constituted by using batch antennas. A transmission antenna 3 has one channel, and a reception antenna has two channels 4(a) and 4(b). As shown in FIG. 15B, assuming the distance between the reception antennas 4(a) and 4(b) as D, two reflection signals from a target received at the reception antennas 4(a), and 4(b) have a phase difference Dsinθ.

The azimuth angle dependent intensity of a sum signal (Sum) and the azimuth angle dependent strength of a difference signal (Diff) of a power received at the two channels are as shown in FIG. 16A, and the ratio of them is calculated as shown in FIG. 16B. It is defined herein for the azimuth angle θ as: θ=0 in the frontal direction of a radar, the incident angle to the right direction is positive(+), and the incident angle to the left direction is negative(−). The data for the azimuth angle dependence is previously measured on every radar. Then, when reception signals are subjected to signal processing and the target is detected, the azimuth angle(θ) of a detection target can be specified by measuring the ratio and the phase difference of the power between the sum signal and the difference signal and referring to the data for the azimuth angle dependence.

An important concept upon practicing the mono-pulse system is that a radar has two different electric wave reception patterns. In a case where reception antennas are combined by two channels in the lateral direction as described above, this corresponds to having two reception patterns displaced in the right and left directions and the azimuth angle position is determined by utilizing the difference of signals obtained by respective channels. Since the mono-pulse system has no mechanical operation section and has no requirement of finely restricting the electric wave emission pattern, it can be easily reduced in the size and decreased in the cost.

Description is to be made for a case where the azimuth angle of a target can be measured accurately and a case where it cannot be measured accurately by using the radar apparatus utilizing the mono-pulse system described above with reference to FIG. 17A, FIG. 17B. It is assumed here that the radar apparatus uses, for example, a 2 frequency CW system for measuring the distance and the velocity of a target.

At first, in FIG. 17A, one's own automobile 80 runs while mounting a radar apparatus 81. An automobile 90 is a target to be measured. A frequency of reception signals reflected at and returned from the automobile 90 is formed as a Doppler shift frequency in accordance with the velocity difference of the two automobiles. By measuring the phase of signals having the Doppler shift frequency, the distance and the azimuth angle to the automobile 90 in front can be measured accurately.

Then, it is considered a case where two automobiles are present in front as shown in FIG. 17B and relative velocities of the two automobiles to one's own automobile are identical. In this situation, since the values of the Doppler shift frequencies of the reception signals reflected at and returned from respective automobiles are identical, frequency peaks of both of them are overlapped when the frequency spectra are observed.

In this case, since detected reflection signals are in the form of synthesis waves for reflection waves by the automobile 92 and the automobile 94, the phases of the reflection waves by the respective automobile 92 and automobile 94 cannot be measured individually. As a result, the azimuth angles for the respective automobiles cannot be determined. In a case where the two reflection signals are synthesized, a measured value is outputted theoretically to a position (one point) 96 near the center for both of them in the existent mono-pulse system when used as it is. Accordingly, it may be a possibility that whether a target is present or not on the extension line of one's own automobile cannot be judged correctly.

As apparent from the foregoing, the mono-pulse system has a problem in that the positions for the automobile 92 and the automobile 94 to be measured cannot be measured accurately in the situation as shown in FIG. 17B.

On the other hand, the automobile periphery monitoring apparatus disclosed in JP-A No.2005-43375 has a function of estimating a position to be detected at present based on the object position data in the past, and providing a predetermined window around the estimation position for the object. Further, the position estimation method for a target object disclosed in JP-A No. H05-180933 calculates the moving direction and the moving amount on every label based on the data in the past and the data at present. Each of them is a method of setting the window or the label as a smoothing means for data by filtration in order to estimate the position of an object or the like to be detected at present more accurately. Neither JP-A No. 2005-43375 nor JP-A No. H05-180933 discloses or suggests the presence of the problems and the means for solving them regarding the interference between two reflection signals in the situation as in FIG. 17B.

The present invention has been accomplished for solving the problems described above and it mainly intends to solve the problems by providing a radar apparatus having signal processing means capable of accurately measuring respective azimuth angles for two targets of an identical Doppler frequency by a simple constitution, as well as a method of measuring the azimuth angle of the target even in a case where two targets having an identical Doppler shift frequency are present.

A typical example of the present invention is as shown below. That is, a radar apparatus including a transmission antenna for transmitting transmission waves to a detection region, a pair of reception antennas disposed being opposed to each other and receiving reflection waves from a target, and a signal processing circuit having a function of processing the reception signals, wherein the signal processing circuit virtually doubles the number of antennas by combining a first data obtained by the pair of reception antennas and a second data obtained at a time different from that for the first data as reception signals into a unit data set, and wherein the signal processing circuit determines the change of intensity of the reception signals based on the unit data set and measures the position for the plurality of targets.

According to the invention, even in a situation where plural targets having an identical Doppler frequency are present, respective azimuth positions can be measured by a radar including a reception antenna 2ch. That is, the drawback of the mono-pulse system can be overcome by simple change for the constitution of a high frequency signal processing circuit section and amendment for the signal processing method.

DETAILED DESCRIPTION OF THE PREFERRED EMBODIMENTS

Figure 15A:
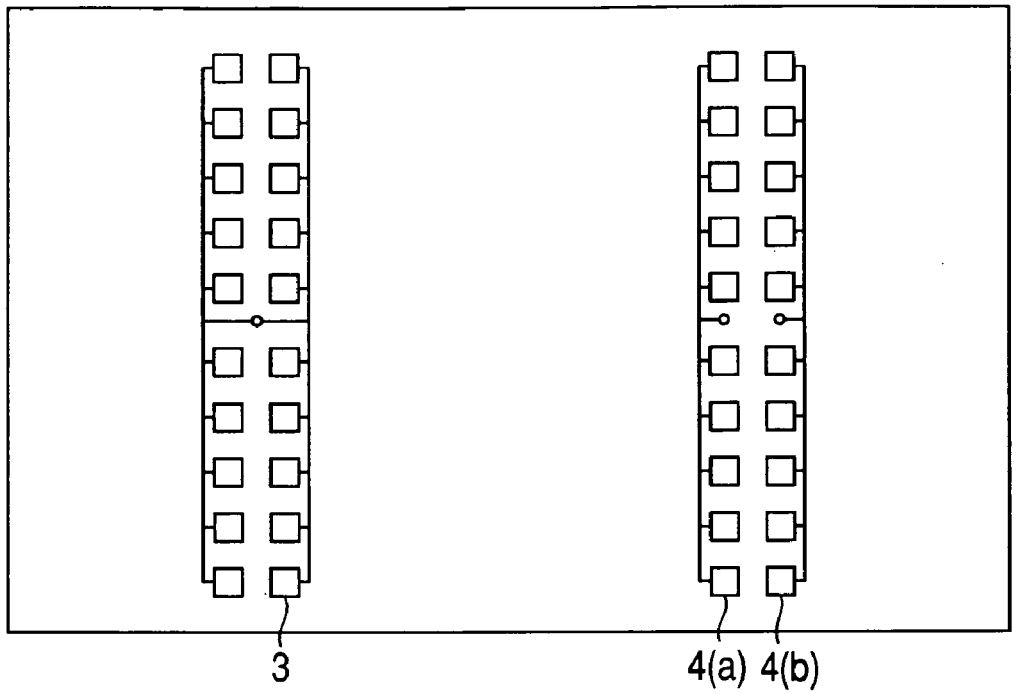
FIG. 15A is a plan view of an antenna for showing a constitutional example of an antenna in a case of practicing a mono-pulse system in an existent example by using batch antennas.
Figure 15B:
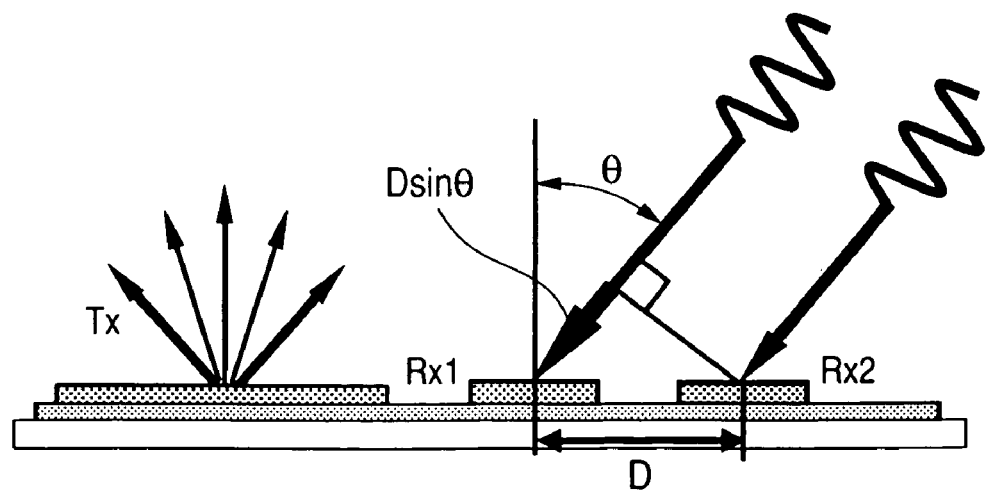
FIG. 15B is a cross sectional view of an antenna for showing a constitutional example of an antenna in a case of practicing a mono-pulse system in an existent example by using batch antennas.
Figure 16A:
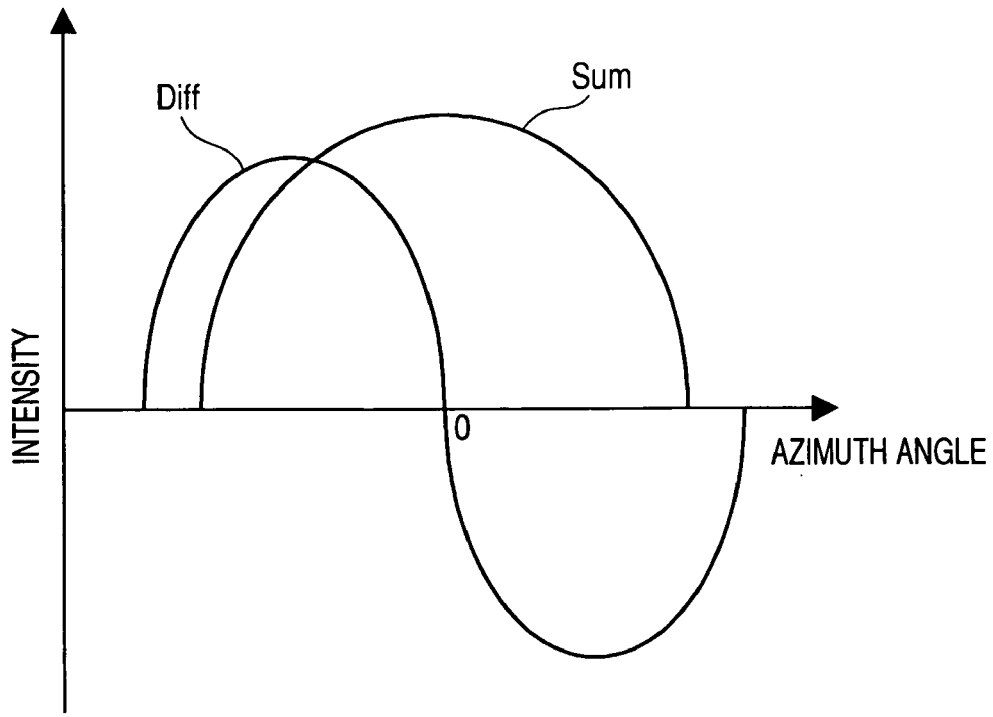
FIG. 16A is a view showing azimuth angle dependence of a sum signal and a difference signal for signals received by two antennas for attaining mono-pulse system in an existent example.
Figure 16B:
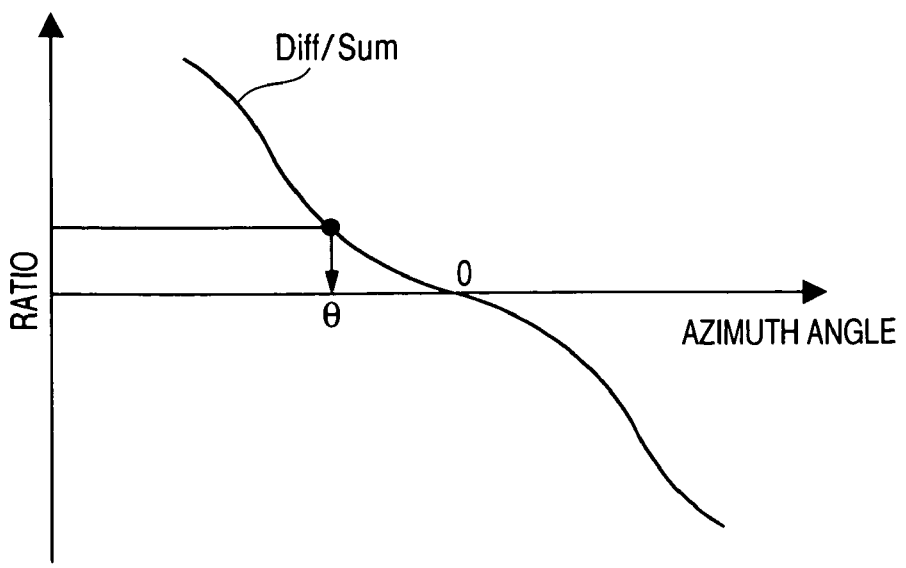
FIG. 16B is a view showing the principle for the measurement of an azimuth angle by a mono-pulse system of an existent example.
Figure 17A:
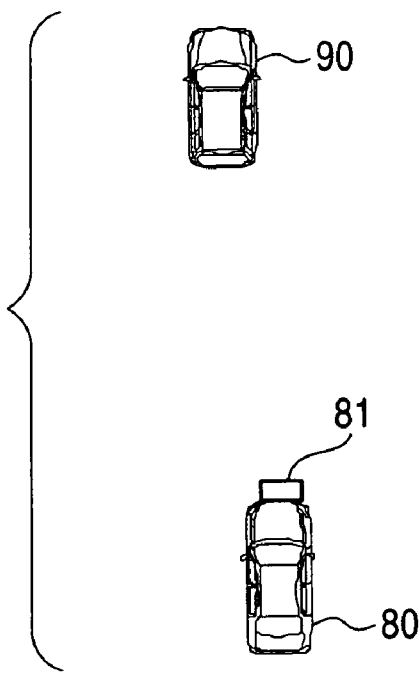
FIG. 17A is a view showing a positional relation between an automobile that mounts a radar thereon and an automobile to be detected.
Figure 17B:
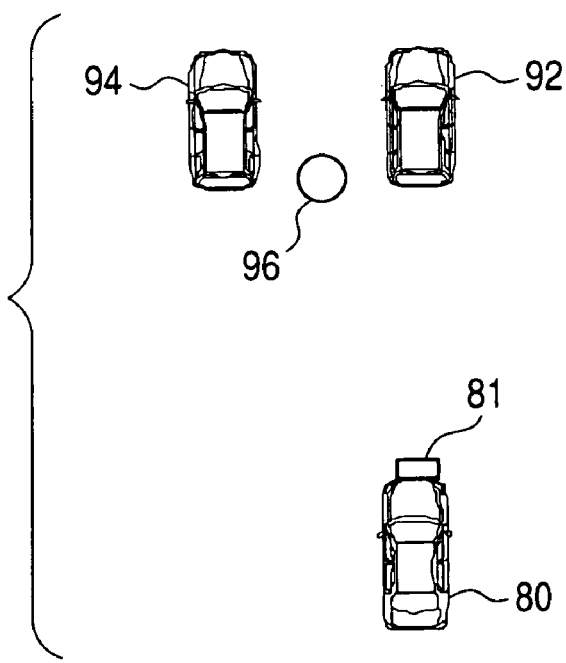
FIG. 17B is a view showing a running scene in which accurate detection cannot be conducted by a mono-pulse system of an existent example.

At first, the outline of the principle of the invention is to be described. Description is to be made to a case in which two targets are present as shown in FIG. 17B which is referred to as an example incapable of correct detection by the mono-pulse system. Further, it is assumed here that the antenna of the automobile-mounted radar apparatus is provided with a pair of reception antennas, that is, reception antennas 4(a), 4(b) comprising two channels as shown in FIG. 15, by which reception signals are obtained separately.

Figure 1A:
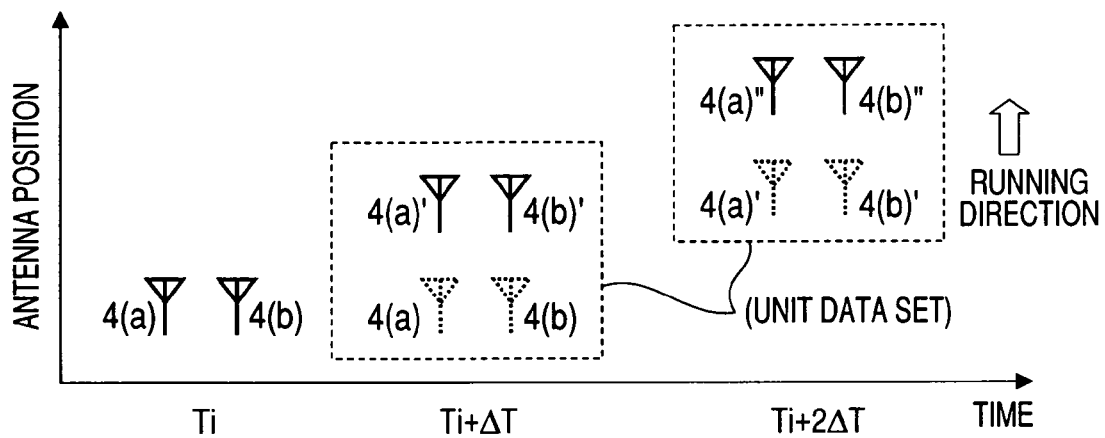
FIG. 1A is a view for explaining the operation principle of the invention of measuring an azimuth angle of an object by using data in the past when an identical antenna was situated at a slightly different place (time Ti) and data at a present position (time Ti+ΔT) together.

In the invention, as shown in FIG. 1A, data in the past (time Ti, first data) when an identical antenna was situated in a slightly different place and data at a present position (time Ti+ΔT, second data), that is, data corresponding to four antenna positions 4(a), 4(b), 4(a)', 4(b)' on every slightly different time difference ΔT are combined respectively as a unit data set. Similarly, data in the past (time Ti+ΔT, second data) when an identical antenna was situated in a slightly different place and data at a present position (time Ti+2ΔT, third data), that is, data corresponding to four antenna positions 4(a)', 4(b)', 4(a)", 4(b)" on every slightly different time difference ΔT are combined respectively as a unit data set. Then, a signal processing method of determining the change of the intensity of reception signals from the data set of each unit and measuring the azimuth angle of a targets is used. In this invention, by utilizing the information where a radar apparatus is at different positions, an effect similar to that of increasing the number of antennas along the moving direction of the radar is obtained virtually.

As has been described above already, since reflection signals from the two targets are usually observed as a synthesis signal under the situation of FIG. 17B, individual reflection signals cannot be measured. Then, signal processing is conducted so that the reflection signals from the two targets are not synthesized.

When predetermined calculation is conducted for two or more reception signals obtained at the reception antenna, an azimuth angle direction in which the antenna gain decreases (hereinafter referred to as a null-point) can be generated as in the form of signal processing. Further, the low gain direction can also be scanned in the azimuth angle direction. When the low gain direction coincides with the direction of one of the targets present by the number of two, it attains a state where the reflection signal from the one target is not received and attains a state where only the reflection signal from the other target is received. That is, a state where the signal synthesis does not occur is attained. In the invention, the azimuth angle of an object is measured by detecting the state described above.

Figure 2A:
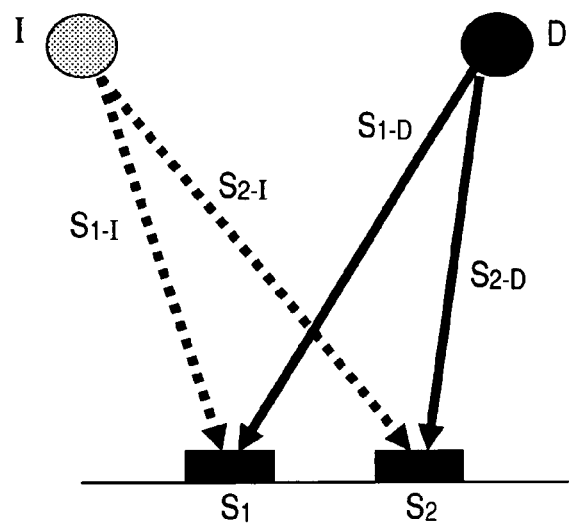
FIG. 2A is a view showing a state of generating a direction of an azimuth angle of low antenna gain as in the form of signal processing by calculating a linear sum of two reception signals while rotating the phase of one of them.
Figure 2B:
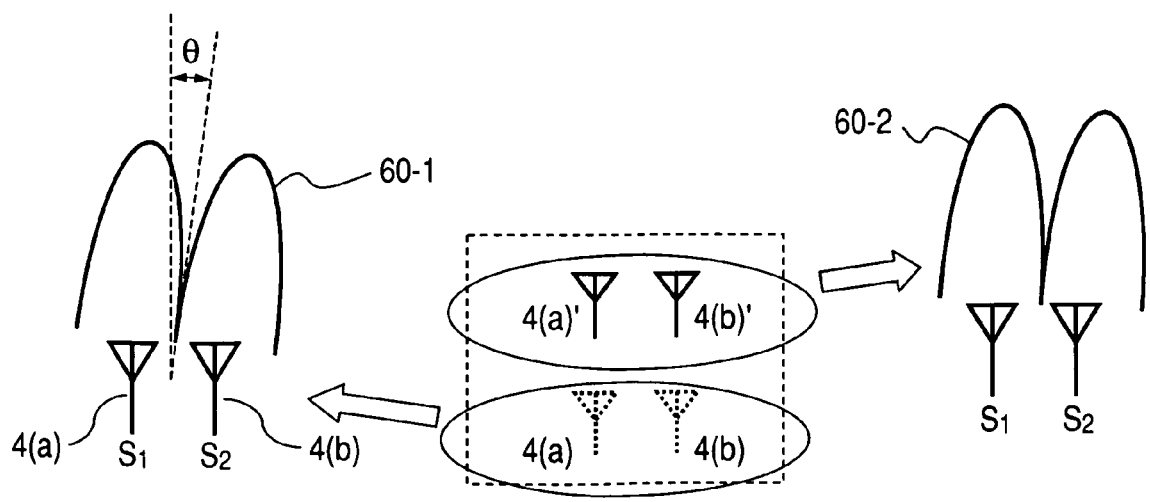
FIG. 2B is an explanatory view for the operation principle of the invention showing a state of generating the direction of azimuth angle of low antenna gain and scanning the same in the direction of the azimuth angle by conducting a predetermined calculation to the reception signals of two reception antennas.

The situation is to be described more specifically referring to FIGS. 2A and 2B. Signals for the unit data set obtained by two reception antennas (corresponding to first data (4(a), 4(b), corresponding to second data (4(a)', 4(b)') are Fourier-transformed respectively and reflection signals from the targets are detected. The two signals detected herein for each of the first data and the second data contained in the unit data set are complex numbers and have phase information in addition to amplitude information corresponding to a signal intensity. The values for the two complex numbers are to be described as $S_1$, $S_2$.

A linear sum $XS(\theta)$ is calculated in accordance with the following formula (formula 1) while rotating the phase by $\theta$ for the complex number value $S_1$:

$$XS(\theta) = S_1 \cdot e^{j\theta} - S_2 \quad (1)$$

That is, as shown in FIG. 2A, an azimuth angle direction of low antenna gain is generated as in the form of signal processing by calculating a linear sum for both of them while rotating the phase of one of the two reception signals obtained by the reception antennas present by the number of two.

The schematic view for the azimuth angle gain characteristic of the reception antenna constituted by conducting the calculation is as shown by a curve 60-1 (corresponding to the first data), and a curve 60-2 (corresponding to the second data) in FIG. 2B. This shows that the antenna gain is high in the azimuth angle direction forming two hills in the azimuth angle gain characteristic curve 60 and the antenna gain is low in the azimuth angle direction forming a valley in the azimuth angle gain characteristic curve 60 (null-point). The curve

60-1 in FIG. 2B shows a state where the gain is low in the direction of the azimuth angle θ and the reflection waves from the direction are scarcely received. Calculation of XS(θ) relative to the phase rotation angle θ of various values in formula 1 corresponds to change of the low gain direction to various directions in FIG. 2B. Accordingly, calculation of XS(θ) while intentionally rotating the phase rotation angle θ is identical with scanning of the low gain direction in the azimuth angle direction.

In actual processing, since the low gain direction is scanned to various azimuth angles, the direction of the antenna where the null-point coincides with the direction of the target cannot be recognized. Then, the data of XS(θ) when the radar situated at two different places are used and signal intensities are compared before and after the fine movement of the antenna.

That is, in the invention, as shown in FIG. 1A, the position for an object to be detected is measured by using two sets of data obtained at two slightly different times (Ti, Ti+ΔT) as a unit data set by an identical antenna mounted on a radar apparatus. Thus, the azimuth angle of the detected object is measured by using two sets of data including data of XS(θ) obtained at the antenna position (4(*a*), 4(*b*)) at present (time Ti), and the data of XS(θ) obtained at the antenna position (4(*a*)', 4(*b*)') slightly different from the present position (time Ti+ΔT) of the automobile. In other words, signal processing capable of obtaining the effect equivalent with that of virtually increasing the number of antennas to four (4(*a*), (*b*), 4(*a*)', 4(*b*)') can be conducted.

Figure 1B:
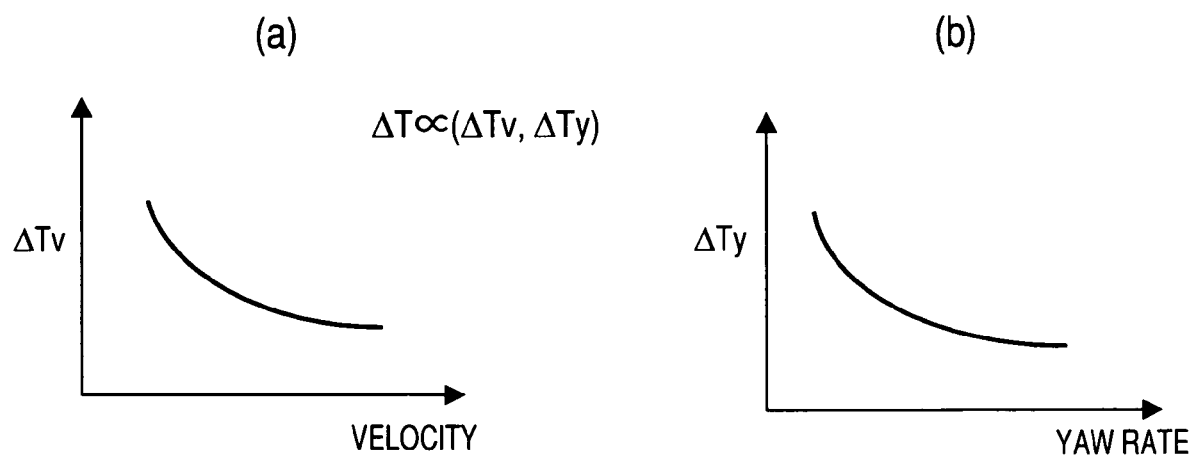
FIG. 1B is a view for explaining minute time ΔT corresponding to the slightly different place of an antenna in the invention.

A minute time distance for obtaining the first data and the second data, that is, a slightly different time difference ΔT is changed in accordance with the moving velocity of the radar apparatus, that is, the running velocity of an automobile mounting the radar apparatus and the yaw rate of the automobile as shown in FIG. 1B.

$$\Delta T \propto (\Delta Tv, \Delta Ty)$$

As described above, ΔT is given as a function in which ΔTv decreases along with increase of the running velocity of the one's own automobile, and also given by a function in which ΔTy decreases along with increase of the curvature of a road.

The signal intensity compared before and after the fine movement of the antenna is a signal intensity calculated by a predetermined calculation from two channels in a case where the low gain direction is scanned in various directions. In a case where the low gain direction and the target direction are aligned, since only the reflection signal from the other target is received, the signal intensity described above scarcely changes only by the fine movement of the radar. Accordingly, it can be seen that the target is present at the azimuth angle along which the low gain direction is directed when the signal intensity becomes identical before and after the movement of the antenna.

On the other hand, in a case where the low gain direction and the direction of the target are not aligned, since the signal intensity changes greatly only by slight change of the positional relation with the target, the signal intensity is not identical before and after the movement of the antenna. Accordingly, when only the azimuth angle in which the signal intensity becomes identical is outputted, this corresponds to the output of the azimuth angle along in which the target is actually present.

As has been described above, according to the invention, even in a case where targets of an identical Doppler frequency are present by the number of two, respective azimuth angles can be measured. This can suppress the output of erroneous detection data and improve the reliability of the output azimuth angle.

In the part of the background art, it has been described that two different beams are necessary in the mono-pulse system. It can be said that data at two times utilized for obtaining two beams in the time difference system of the invention.

Further, while various devices are applied generally for decreasing interference signals in the radar signal processing, it can also be said that the change of intensity of the reception signals by the interference is positively utilized in the invention.

Then, more specific embodiments of the invention are to be described with reference to FIG. 3 to FIG. 13A, and FIG. 13B.

Figure 3:
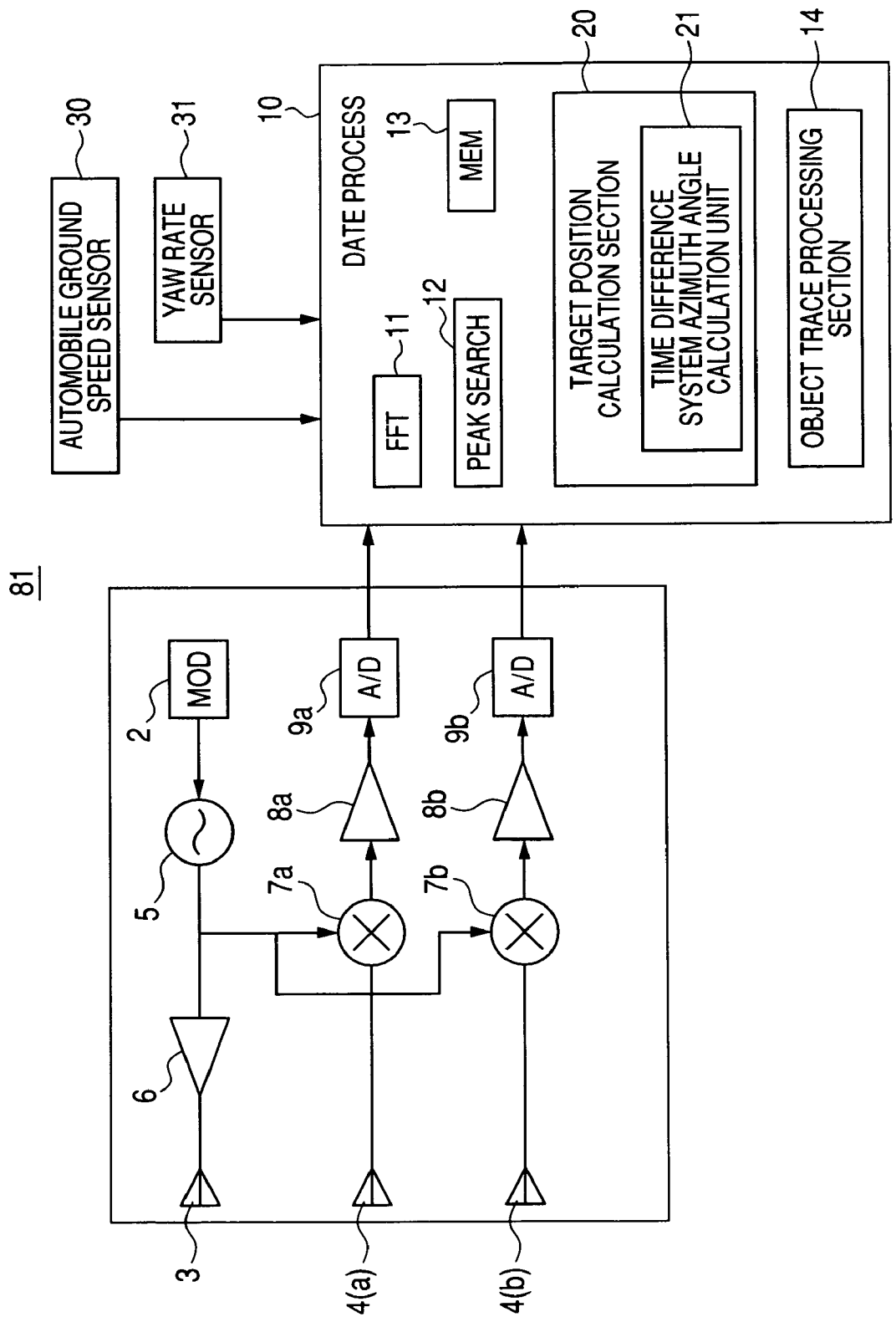
FIG. 3 is a functional block diagram of a radar apparatus according to an embodiment of the invention.

At first, a block diagram of a radar apparatus for practicing an embodiment is to be described with reference to FIG. 3 and FIG. 4. In FIG. 3, a radar apparatus 81 includes an analog circuit 1 having a signal generation function, a transmission function, and a reception function, and a signal processing circuit (digital processor) 10 having a function of processing reception signals. That is, the analog circuit 1 has a modulator 2, an oscillator 5, a power amplifier 6, and a transmission antenna 3 in the transmission system, and reception antennas 4(*a*), 4(*b*), mixer circuits 7(*a*), 7(*b*), power amplifiers 8(*a*), 8(*b*), and A/D converters 9(*a*), 9(*b*) in the reception system. The signal outputted from the A/D converter 9 is processed in the signal processing circuit 10 to determine at least one of the distance to a target or the relative velocity. The signal processing circuit 10 includes a CPU, a memory, and a data processor for holding programs and has a Fast Fourier Transformation (FFT) processing section 11, a peak search processing section 12, a memory 13, a target position calculation section 20, and an object tracing processing section 14. The target position calculation section 20 has a time difference system azimuth angle calculation unit 21. Further, an output from the automobile ground speed sensor 30 and a yaw rate sensor 31 are also inputted to the signal processing circuit 10 and they are recorded and held in the memory 13. Each of the sections described above of the signal processing circuit 10 has a function attained by execution of the calculation processing based on various programs in the CPU. It will be apparent that the specific constitution of the signal processing circuit 10 may also be attained by integrating a portion of the function for each of the sections in combination or further dividing the portion.

The information obtained by the object tracing processing section 14 is sent to an external ACC (Adaptive Cruise Control) device by way of a serial communication device, etc. to conduct running control for the automobile.

Figure 4:
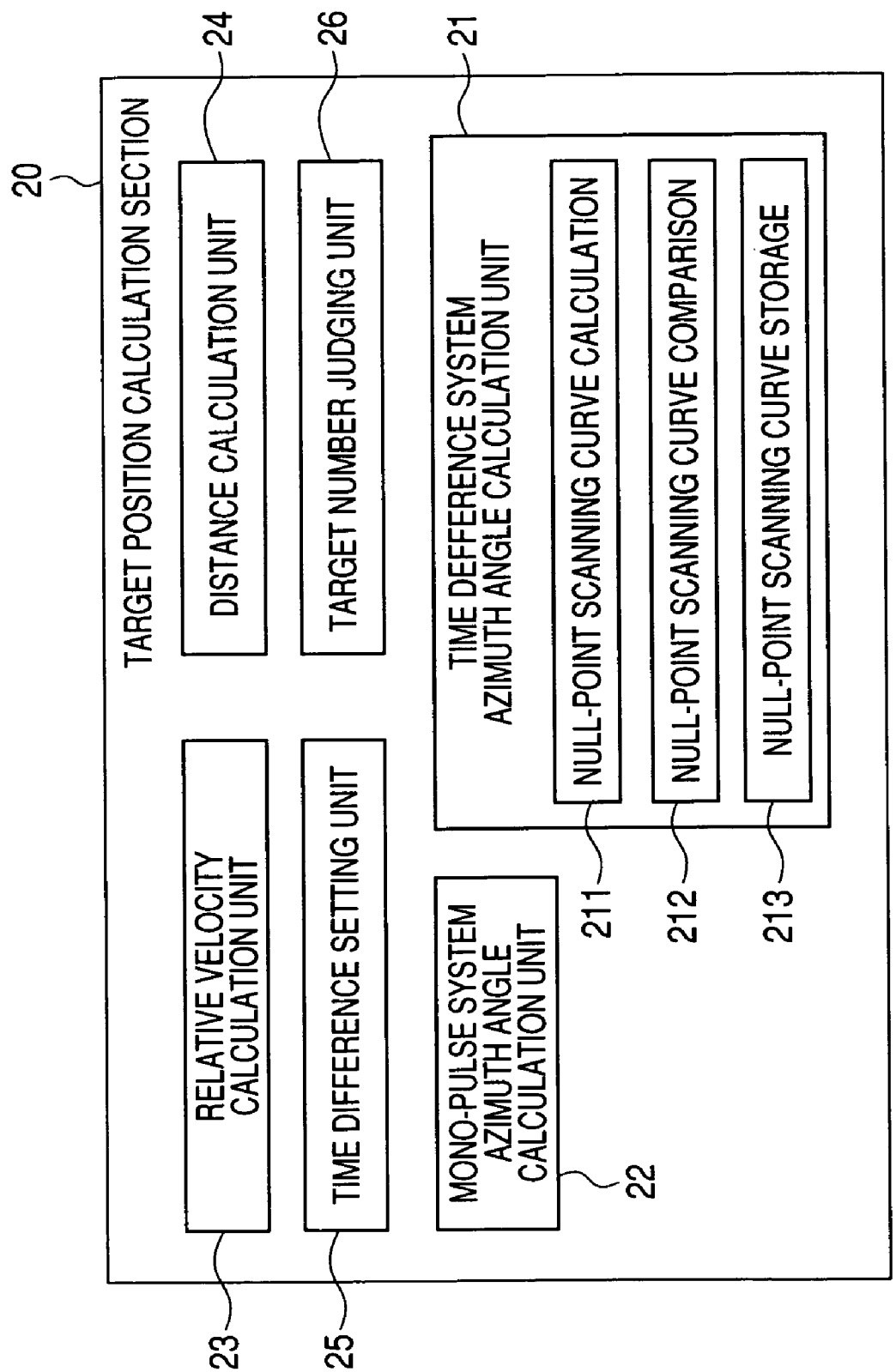
FIG. 4 is a view showing an example of a more specific constitution for a target position calculation section in FIG. 3.

FIG. 4 shows a more specific constitutional example of the target position calculation section 20. The target position calculation section 20 has, in addition to the time difference system azimuth angle calculation unit 21, a mono-pulse system azimuth angle calculation unit 22, a relative velocity calculation unit 23, a distance calculation unit 24, a time difference setting unit 25, and a target number judging unit 26. The time difference system azimuth angle calculation unit 21 has a null-point scanning curve calculation section 211, a curve comparison section 212, and a null-point scanning curve memory section 213. The null-point scanning curve calculation section 211 has a function of calculating null-point scanning curves (curve 110, 120 in FIG. 11) to be described later. The null-point scanning curve comparison section 212 has a function of determining an intersection between two null-point scanning curves, that is, an azimuth angle of the target. The information regarding the null-point is held in the null-point scanning curve memory section 213.

In the relative velocity calculation unit 23 and the distance calculation unit 24, the relative velocity and the distance of respective targets are calculated, for example, based on the principle of a 2 frequency CW system. The function of the null-point scanning curve calculation section 211 and the curve comparison section 212 of the time difference system azimuth angle calculation unit 21 is to be described later.

The target number judging unit 26 judges the number of targets from the processed data of the reflection signal and conducts judging processing in that the processing for the calculation of the azimuth angle should be conducted by the time difference system azimuth angle calculation unit 21 or by the mono-pulse system azimuth angle calculation unit 22.

Each of the azimuth angle calculation units 21, 22 calculates the azimuth angle. That is, even in a case where two targets of an identical Doppler frequency are present in the reflection signal, the time difference azimuth angle calculation unit 21 calculates respective azimuth angles based on the time difference system described with reference to FIG. 1A. On the other hand, in a case where the target is present by the number of 1, the azimuth angle is calculated by the mono-pulse system azimuth angle calculation unit 22.

It will be apparent that the constitution of the target position calculation section 20 may also be attained by combining and integrating a portion of the function of each of the units or each of the sections described above, or further dividing a portion of them.

Figure 5:
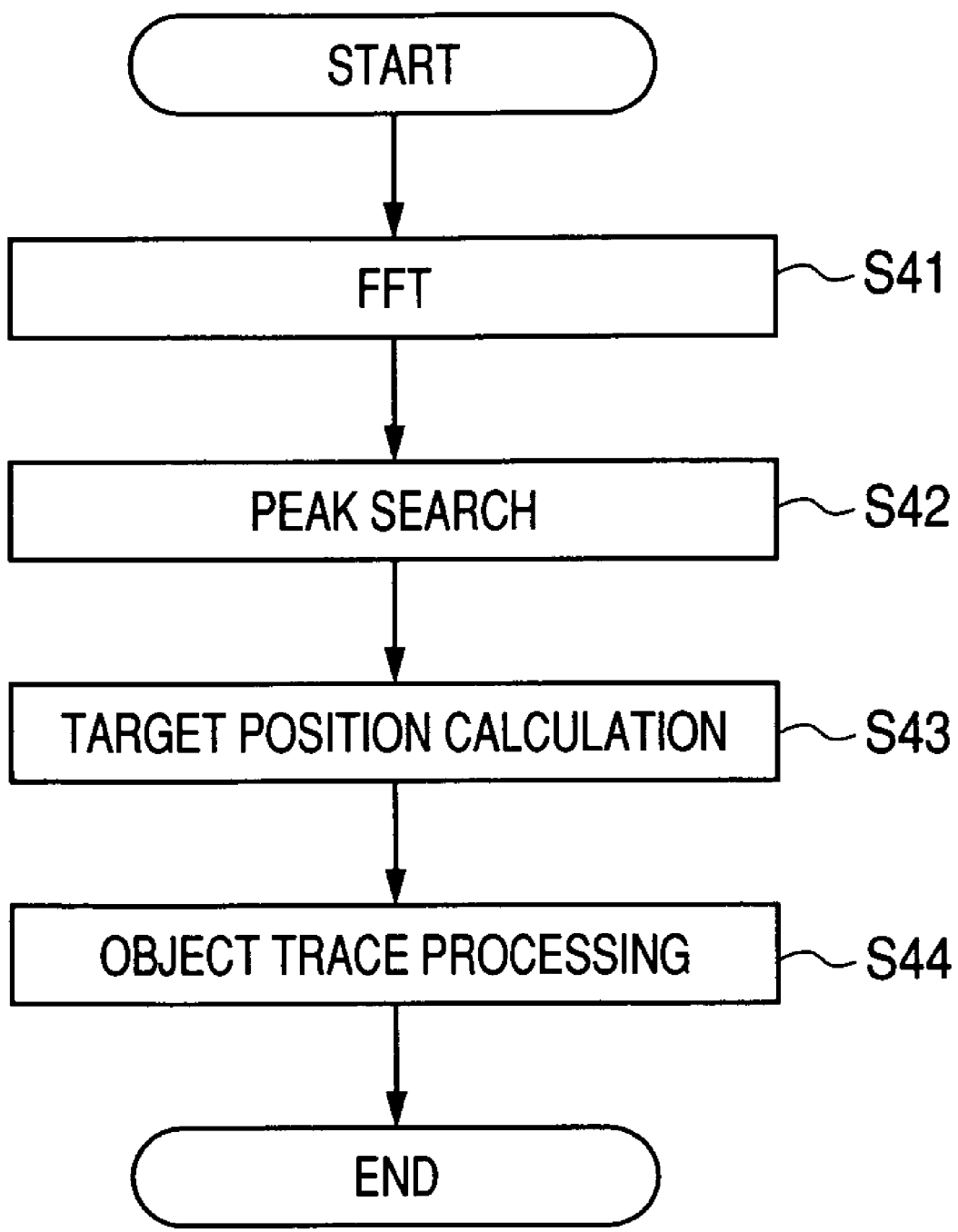
FIG. 5 is a flow chart of signal processing for measuring positional information of a detection object, etc. in a radar apparatus according to an embodiment of the invention.
Figure 7:
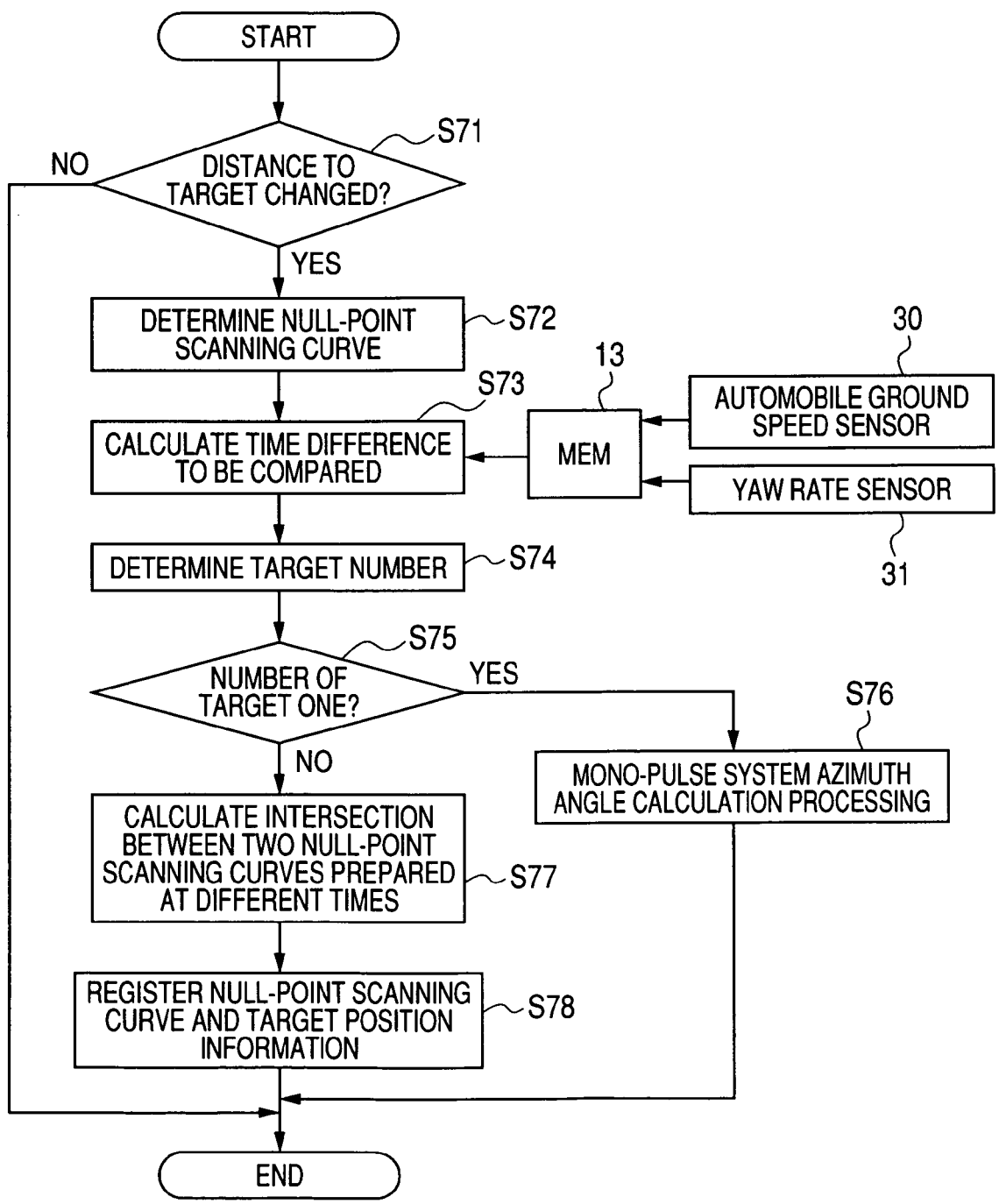
FIG. 7 is a flow chart for processing of measuring an azimuth angle of a target in an embodiment of the invention.

Then, the operation of the embodiment according to the invention is to be described based on the flow chart of FIG. 5 and FIG. 7.

Figure 6A:
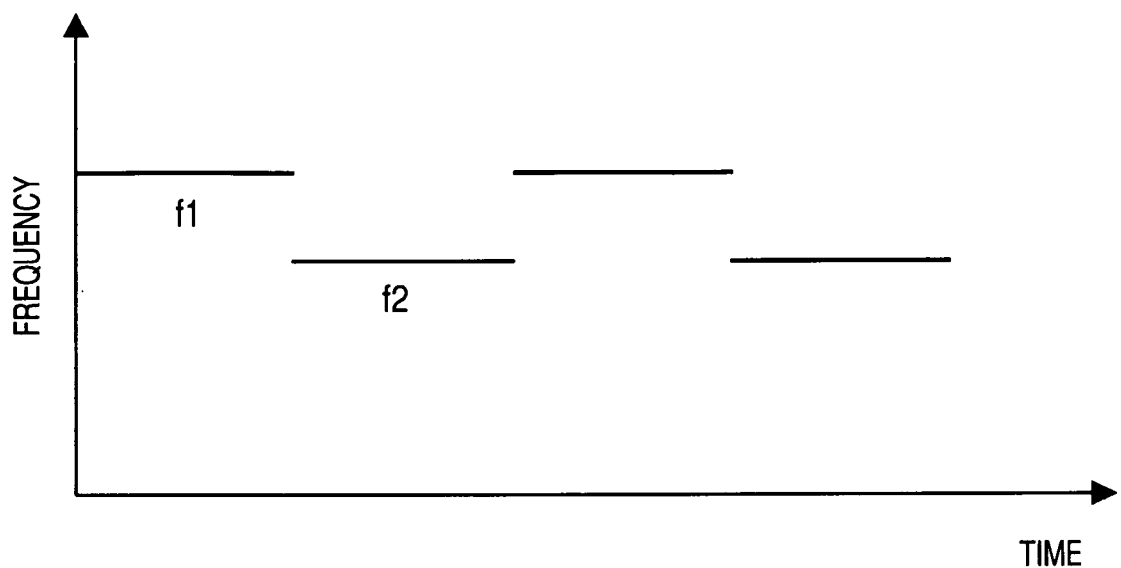
FIG. 6A is a view showing an example of an oscillation frequency pattern of an oscillator in the embodiment of the invention.
Figure 6B:
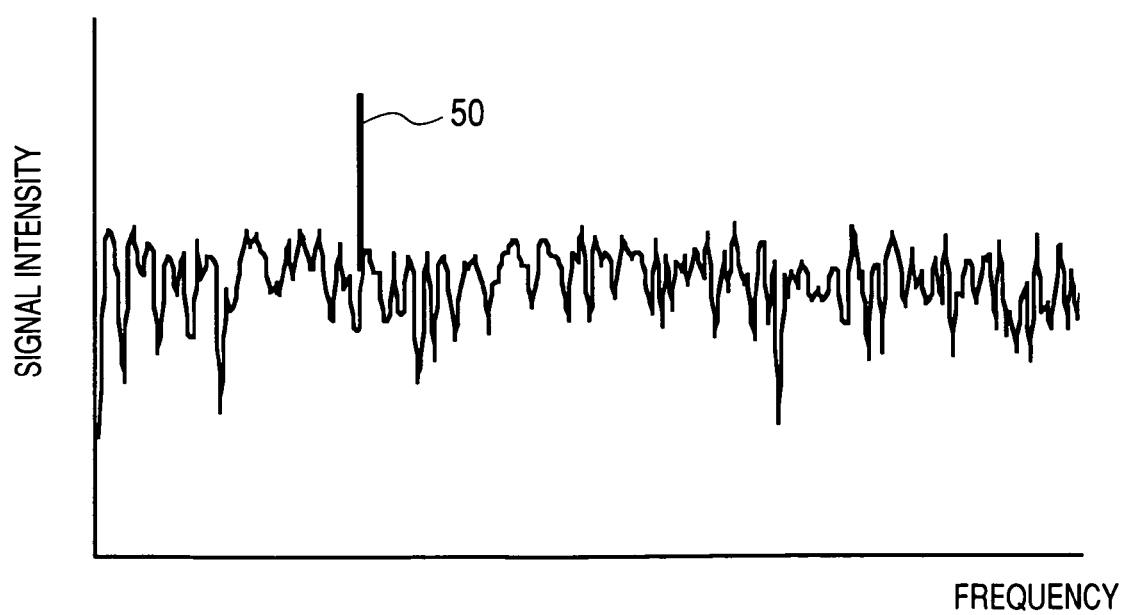
FIG. 6B is a view for a frequency spectrum representing that the Doppler frequency generated by reflection of transmission waves on a moving object is observed as a peak.

The oscillator 5 in the analog circuit 1 oscillates at a frequency pattern, for example, as shown in FIG. 6A based on the modulation signal from the modulator 2. This is the frequency modulation system referred to as a 2 frequency CW system but, instead, other systems, for example, an FMCW type modulation system or the like may also be used. The frequency modulated high frequency signal is amplified by the power amplifier 6 and then emitted from the transmission antenna 3 as transmission waves to the detection region.

The electric waves transmitted from the transmission antenna 3 are reflected at an object (target) in the emission region and the returned electric wave signal is received by the reception antenna 4. By mixing the reception signal with the oscillation signal in the mixer circuit 7, a beat signal is generated, and the beat signal is outputted to the power amplifier 8. The signal amplified by and outputted from the power amplifier 8 is converted by the A/D converter 9 into a digital signal and then sent to the signal processing circuit 10.

In the signal processing circuit 10, a predetermined calculation is conducted to the reception signal in accordance with a flow chart shown in FIG. 5.

At first, for each of the data of the unit data set obtained in each of the modulation sections, frequency analysis is conducted by Fast Fourier Transformation (FFT) at step 41 to obtain a frequency spectrum. When reflection waves from an object are received, they are observed as a frequency peak at a high signal-to-noise power ratio (S/N), for example, as shown in a peak 50 at the frequency spectrum chart shown in FIG. 6B. The thus observed peak is extracted by peak search in the next step 42. For the signal extracted here, a position information calculation processing of the target is applied at step 43. The processing at step 43 is executed by the position calculation section 20. The relative velocity calculation unit 23 and the distance calculation unit 24 in the target position calculation section 20 calculate the relative velocity and the distance of the targets respectively based, for example, on the 2 frequency CW system principle.

Then, the two target positions are measured by using the unit data set at step 43 in FIG. 5 and, by utilizing the result, tracking processing is applied respectively at step 44. In this case, based on the measuring information at present predicted from the detection object measuring information in the past, information calculated actually at present is amended. For the amending means, a Kalman filter or an $\alpha\beta$ filter used so far in the field of the radar technique is utilized.

While a case where the targets are present by the number of two is assumed so far, when the target is present by the number of one, $XS(\theta)$ takes an identical value for all azimuth angles at time Ti and Time Ti+$\Delta$T. This is because only the signal for one target is received and no interference is caused irrespective of the low gain direction. The azimuth angle of the target is determined in this case, for example, in accordance with usual mono-pulse system. That is, the azimuth angle of the target is determined by the mono-pulse system azimuth angle calculation unit 22 in FIG. 4 in the manner as described for FIGS. 16A, 16B, 17A and 17B. Then, tracking processing is applied in the step 44.

Each step of the processing described above shown in FIG. 5 is executed repetitively in synchronous with the data input from the analog circuit 1 in the radar apparatus 81.

Then, the operation of the target position calculation section 20 is to be described specifically in accordance with the flow chart shown in FIG. 7.

As has been described above already, of the invention, a unit data set is obtained by utilizing the movement for the position of an automobile-mounted radar during slight time difference $\Delta$T and the number of antennas is virtually increased along with the moving direction of the radar. However, it may be considered such a case as in temporary stop at an intersection where the target approaches the one's own automobile in a state where the position of the radar mounted on the one's own automobile is stopped as it is. In this case, for detecting the change of a relative positional relation between the automobile-mounted radar and the target, change of distance between the one's own automobile and the target at a slight time difference $\Delta$T is utilized.

In FIG. 7, it is judged at step 71 whether the distance between the radar and the target coincides with the value measured at the last time or not. When the distance changes, since the positional relation between the target and the radar changes, the azimuth angle measuring method of the invention can be used. Then, it goes to the step 72 and a null-point scanning curve is determined. The null-point scanning curve is to be described specifically later with reference to FIG. 11. At step 73, it is decided to compare the null-point scanning curve with which null-point scanning curve determined and stored in the past, that is, to compare one set of null-point scanning curves with which value for a slight time difference $\Delta$T between them, based on the output information from the automobile velocity sensor and the yaw rate sensor.

At step 74, the number of targets is determined by the two null-point scanning curves. When the number of the target is one, the value for $XS(\theta)$ has an identical value for all azimuth angles at time Ti and time Ti+$\Delta$T. When the number of the target is one, the azimuth angle of the target is determined in accordance with a usual mono-pulse system (step 75, 76).

At step 77, intersections between two null-point scanning curves (curves 110, 120 in FIG. 11), that is, azimuth angles $\theta_A$, $\theta_B$ for the targets are determined.

Finally, at step 78, the null-point scanning curve determined at present and the target position information are registered in a storage device such as a memory.

Figure 8A:
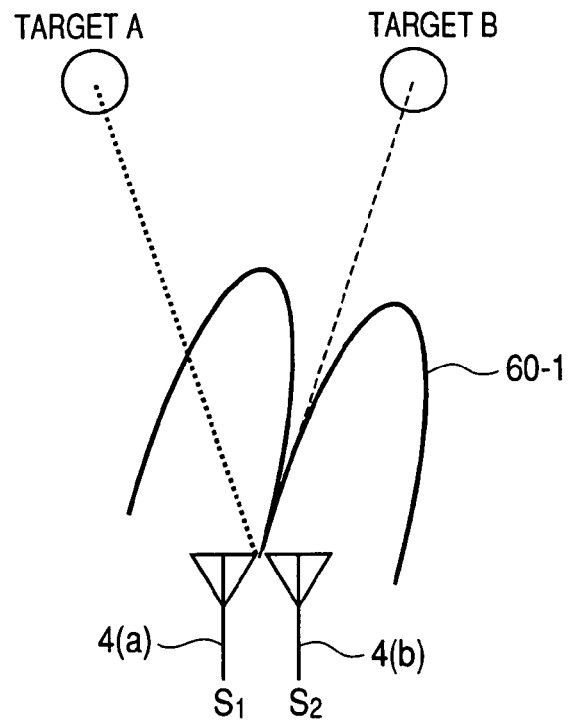
FIG. 8A is a view showing the state that the direction of the azimuth angle of low antenna gain generated by conducting a predetermined calculation to the reception signals of the two reception antennas coincides with the direction of one of two targets.

FIG. 8A shows a state where the direction of the azimuth angle of low antenna gain obtained by conducting predetermined calculation to the unit data set, that is, reception signals of the two reception antennas coincides with the direction of one of the two targets. That is, FIG. 8A shows a case where the phase rotational angle θ in the (formula 1) coincides with one of the two targets. In the drawing, a target A and a target B are present and the phase rotational angle θ coincides with the azimuth angle $θ_B$ of the target B. In this state, the reflection signal from the target B is not received and only the reflection signal from the target A is received. That is, even in a case where targets of an identical Doppler frequency are present by the number of two, a state in which reflection signals from both of them are not synthesized is generated.

Figure 8B:
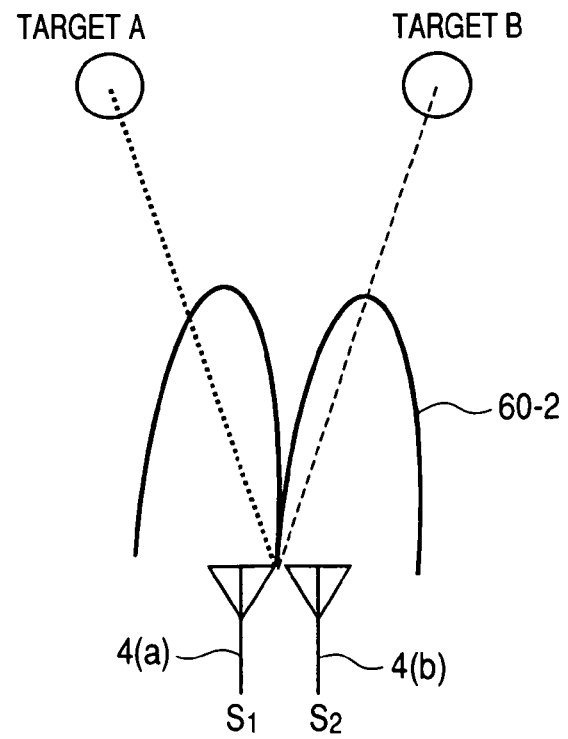
FIG. 8B is a view showing a state where the direction of the azimuth angle of low antenna gain generated by conducting a predetermined calculation to the reception signals of the two reception antennas coincides with none of the two targets.
Figure 9A:
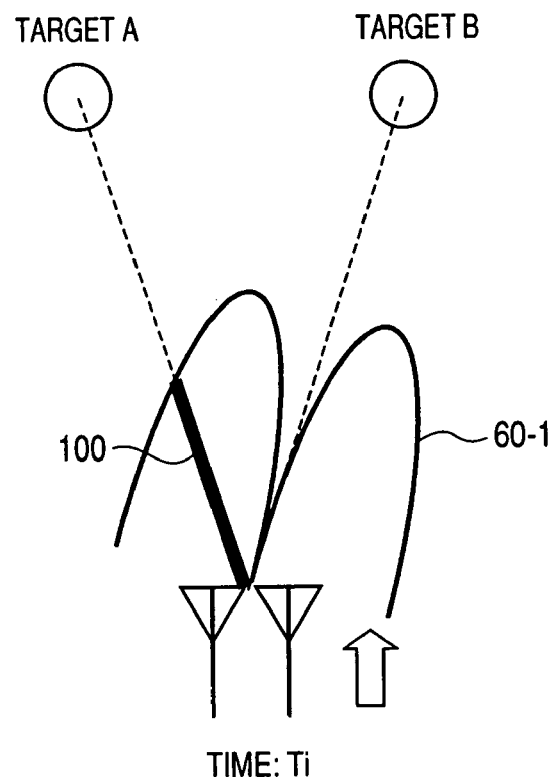
FIG. 9A is a view showing that the intensity of a reception signal is constant even if the antenna advances slightly when the azimuth angle of low antenna gain coincides with the azimuth angle of a target B, and showing that the positional relation between the antenna and the target at time Ti.
Figure 9B:
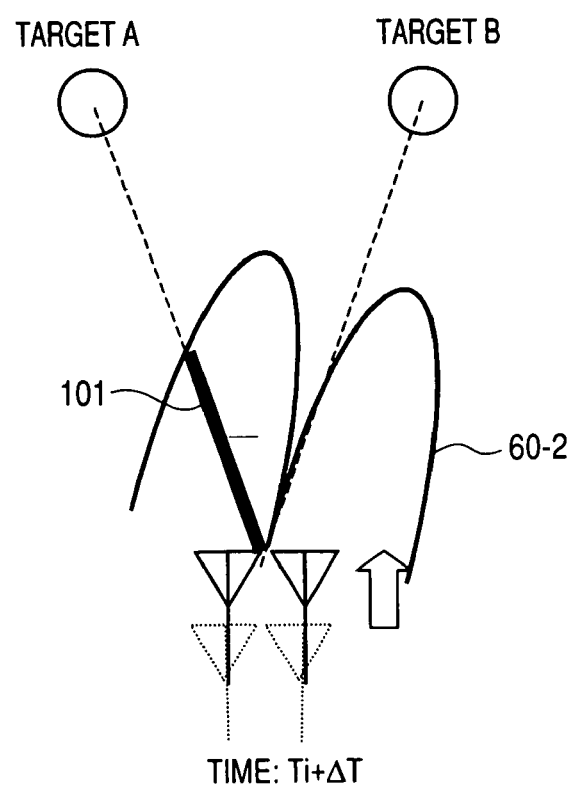
FIG. 9B is a view showing that the intensity of a reception signal is constant even if the antenna advances slightly when the azimuth angle of low antenna gain coincides with the azimuth angle of a target B, and showing that the positional relation between the antenna and the target at time Ti+ΔT.
Figure 10:
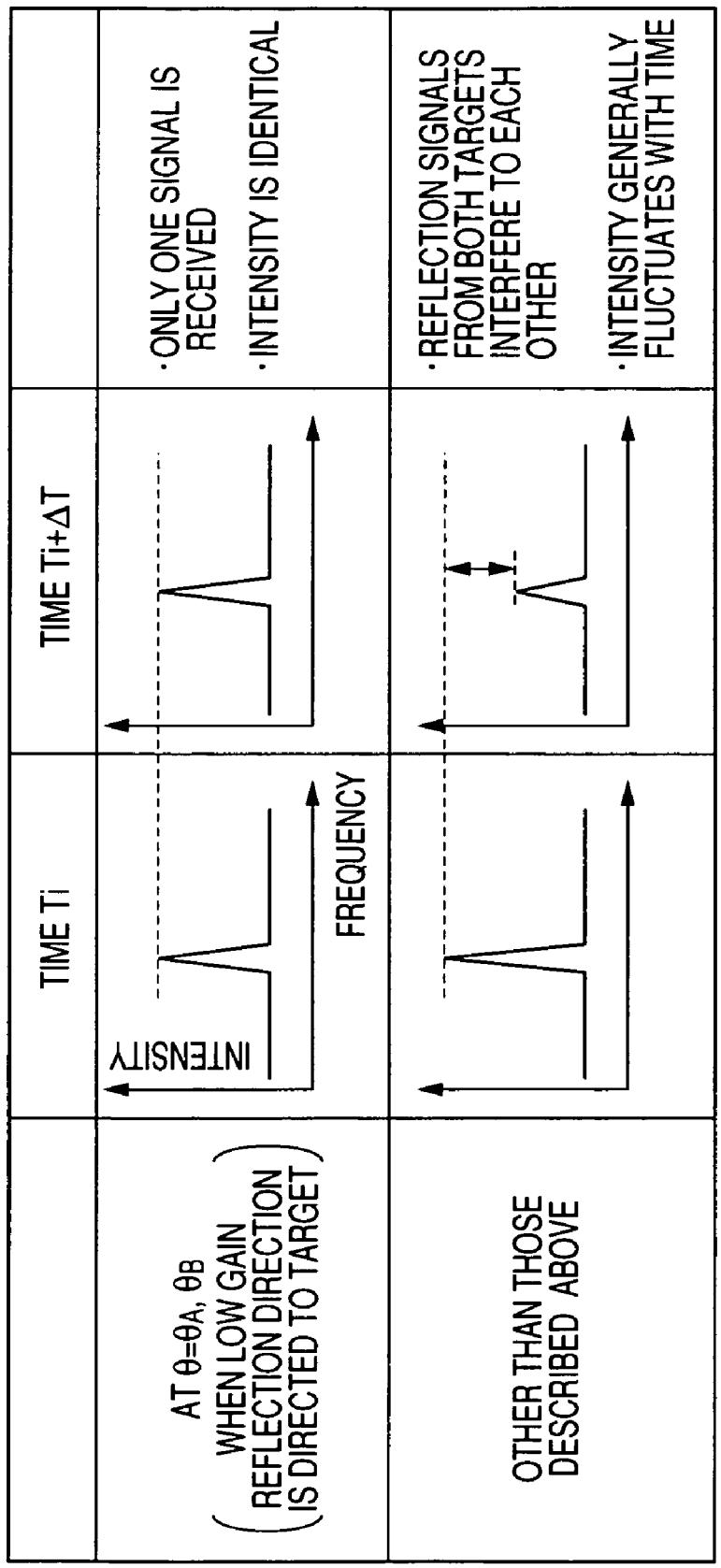
FIG. 10 is a view for explaining that the difference is caused to fluctuation with time of the intensity when plural targets are present between a case where the direction of an azimuth angle of low antenna gain coincides with the direction of the target and a case where they are not aligned.

On the other hand, FIG. 8B shows a situation in which the azimuth angle of low antenna gain generated by conducting predetermined calculation to the reception signals of the two reception antennas coincides with none of the two targets. As described above, when the low gain direction does not coincide with the direction of the target, reflection signals from the two targets are synthesized. The state is expressed also as that in which two reflection signals interfere with each other.

In the state as in FIG. 8B, since the two signals are synthesized, individual azimuth angles cannot be measured. In a case where the state in FIG. 8A occurs, the azimuth angle position of the target can be seen when the phase rotational angle θ is determined. However, in actual calculation, the low gain direction is scanned for all azimuth angle directions, and it cannot be recognized that the state of FIG. 8A is attained in what direction.

Then, the azimuth angle of the target is determined by the following method.

Figure 11:
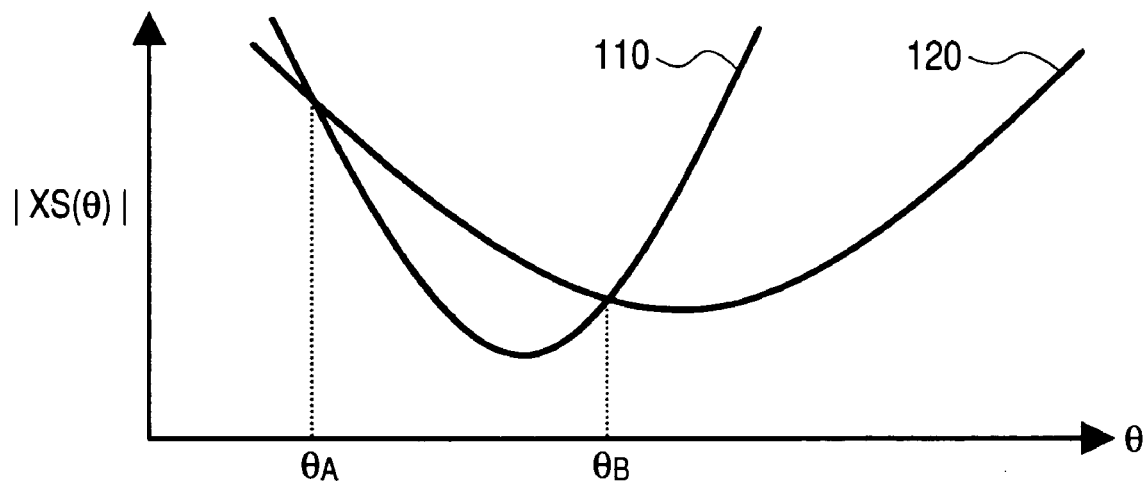
FIG. 11 is a view for azimuth angle dependence of the intensity of signals obtained by conducting a predetermined calculation on reception signals of two reception antennas based on the data at two times apart by a minute time ΔT.

At first, the phase rotational angle θ of XS(θ) represented by the formula 1 is calculated while changing the phase rotational angle θ within the range of the detection angle, for example, at a step of 0.1 degree. Then, when an absolute value of XS(θ) is drawn as a function of the phase rotational angle θ, it generates a null-point scanning curve 110, for example, as shown in FIG. 11. In the invention, the thus generated curve is defined as a null-point scanning curve. The time at this point is defined as Ti. Successively, when identical calculation processing is conducted and a similar curve is drawn also at Ti+ΔT when the time lapses by a slight time ΔT, a null-point scanning curve 120 is generated, for example, as shown in FIG. 11. The time apart by a slight time ΔT may be, for example, a fixed value of about several tens mm sec, or it may be changed in accordance with the information of the running state of the one's own automobile obtained from the automobile velocity sensor 30 or the yaw rate sensor 31 with the initial value of about several tens mm sec as a reference.

In the followings, it is to be described that the phase rotational angles θ at the intersections between the two null-point scanning curves 110 and 120 form azimuth angle positions $θ_A$, $θ_B$ of the targets.

The state in FIG. 8A is a state where only the reflection signal from the target A is received. The signal intensity scarcely changes only by the subsequent fine movement of the radar. That is, the absolute value of XS($θ_A$) takes a substantially identical value at time Ti and Ti+ΔT. This can be interpreted as below with reference to FIG. 9A and FIG. 9B. When the null-point is directed to the target B at time Ti, the intensity of the reflection waves from the target A is represented by the length L1 of a thick line 100 in FIG. 9A. Then, also at time Ti+ΔT, the intensity of the reflection waves from the target A is represented by a thick line 101 in FIG. 9B in the same manner. In this case, when Ti+ΔT−Ti is small, it can be considered that the length L2 for the thick line 100 and the thick line 101 is identical.

In the same manner, when the low gain direction is directed to the target A, since this is a state of receiving only the reflection signal from the target B, XS($θ_B$) is substantially identical at time Ti and time Ti+ΔT.

On the other hand, when the phase rotational angle θ is an azimuth angle different from that for the target position, since the reflection signals from the two targets interfere to each other, when the position of the radar moves with lapse of time to change the positional relation with the targets, the way of synthesizing the reflection signals for both of them is different. In this case, the intensity of the synthesis signal generally fluctuates greatly and XS(θ) takes different values between time Ti and Ti+ΔT (L1≠L2). The behavior described above is summarized as a table in FIG. 10.

That is, at θ=θA, θB (when the low gain direction is directed to the target), only the reflection signal from one target is received and the intensity is identical. On the other hand, under the conditions other than those described above, reflection signals from both targets interfere to each other. Then, the intensity of the reflection signal fluctuates with time.

From the foregoing, it can be seen that the azimuth angle positions $θ_A$, $θ_B$ for the target A and the target B are determined by determining the positions for the intersections between the two null-point scanning curves 110 and 120.

When the slightly different time difference ΔT is excessively long, it is difficult to detect the state in which the lengths of the thick line 100 and the thick line 101 are equal and the two reflection signals in the interference state are difficult to be distinguished. On the contrary, when the time difference ΔT is excessively short, a great amount of data for a state where the lengths for the thick line 100 and the thick line 101 are equal are obtained unnecessarily. In other words, it can be seen in the invention that the slightly different time difference ΔT may be set properly as a time distance suitable for obtaining an appropriate number of data when the low gain direction is directed to one of the targets, the reflection signal XS($θ_B$) from the other of the targets is detected as a substantially identical state.

Figure 12:
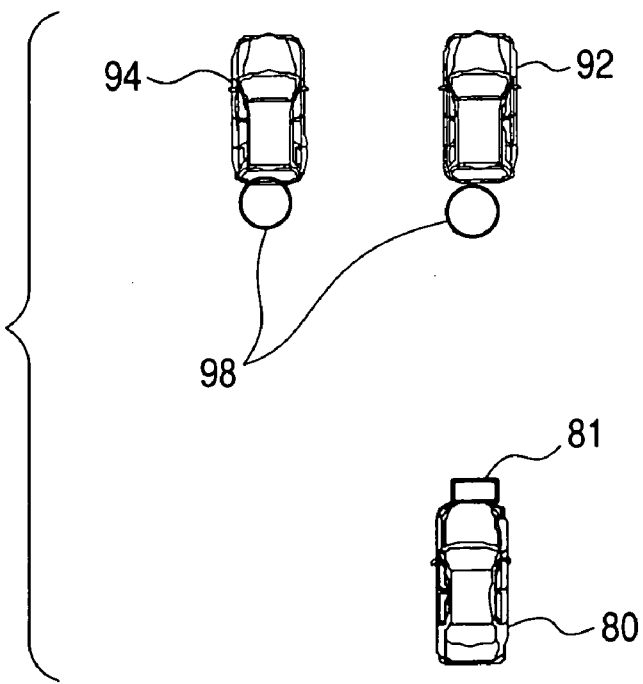
FIG. 12 is a view showing the target position measured by the radar apparatus of the invention in the scene in FIG. 17B.

In accordance with the processing as described above, even when the reception antennas are present only by 2 channels, since the azimuth angles of the two targets of an identical Doppler frequency can be measured individually, the result of the radar output coincides with the actual two target positions as shown by two points 98 also in the scene as shown in FIG. 12. Accordingly, erroneous detection output can be decreased when compared with the case of utilizing the general mono-pulse system.

Figure 13A:
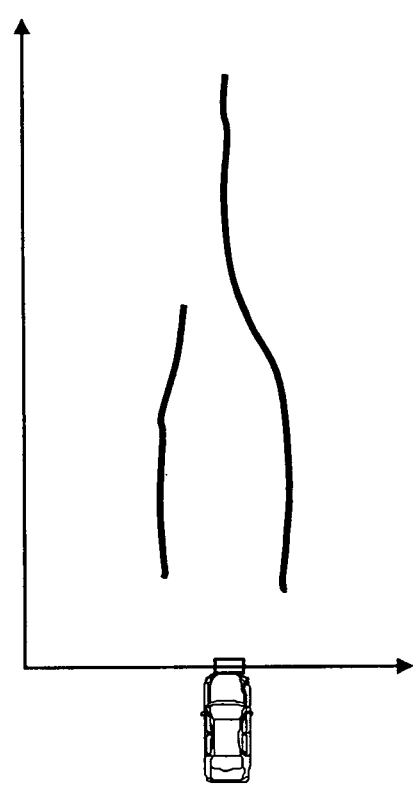
FIG. 13A is a view showing an example of a result of an experiment that conducts target position detection processing by mounting a radar apparatus according to an embodiment of the invention on an automobile.
Figure 13B:
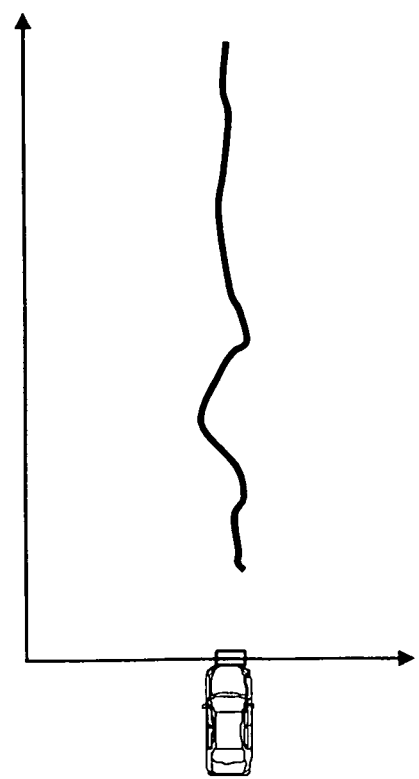
FIG. 13B is a view showing an example of a result of an experiment that conducts target position detection processing by mounting a radar apparatus according to an existent mono-pulse system.
Figure 14:
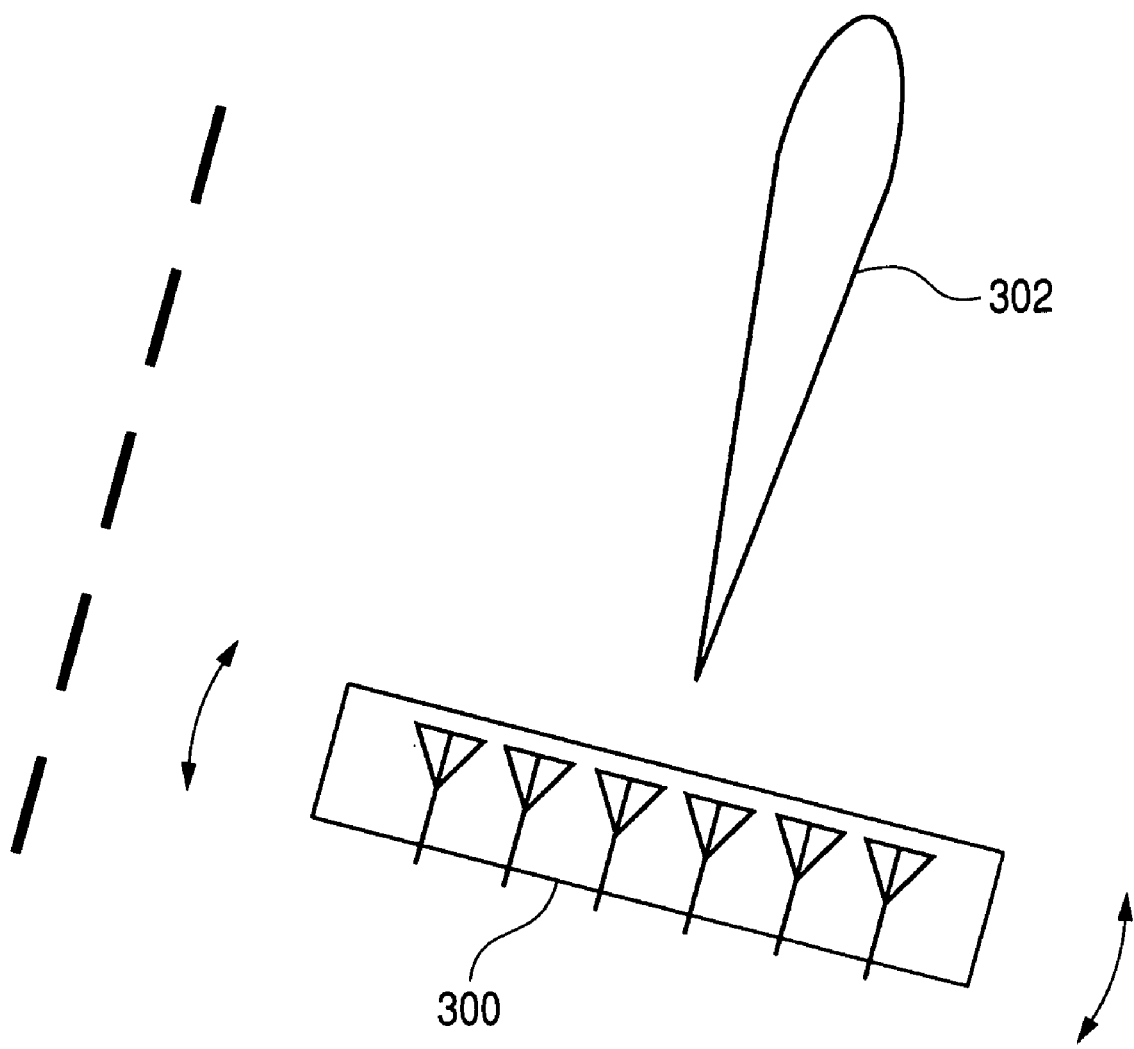
FIG. 14 is a view showing the principle of a scanning system of an existent example.

FIG. 13A and FIG. 13B show an example of the result of an experiment that conducts processing for detecting the target position by mounting a radar apparatus according to the embodiment of the invention and a radar apparatus according to the existent mono-pulse system respectively on automobiles. FIG. 13A shows the result of an embodiment of the invention and FIG. 13B shows that by an existent mono-pulse system. In each of the cases, it is assumed as a premise that the reception antenna of the radar apparatus comprises 2 channels and two targets are positioned in a detection region in front of the one's own automobile (like the scene as in FIG. 12), and the velocity of the one's own automobile is higher than the velocity of the two targets running in front. According to the embodiment of the invention, as shown in (A), two targets can be distinguished distinctly on the side of the distance nearer to the distance where the angle between the two targets is equal with the minimum separable angle. On the other hand, in the existent mono-pulse system, it is detected as if one target staggers as shown in (B). This is because reflection signals from the two targets interfere to each other.

As described above, according to the invention, it is possible to provide a radar apparatus having a signal processing device capable of measuring the respective azimuth angles of the two targets, even when two targets of an identical Doppler shift frequency are present, by a simple constitution, for example, by adding a function of time difference system azimuth angle calculation to the hardware structure of the radar apparatus adopting a mono-pulse system.

It will be apparent also in a case where the radar apparatus is in a stationary state that the azimuth angle of a target moving relatively to the radar apparatus can be measured by using the signal processing described above in the signal processing circuit 10 having a time difference system azimuth angle calculation unit 21, etc. to such a target. That is, in a radar apparatus for detecting an object by emitting electric waves and processing reflection waves thereof, respective azimuth angles of two targets can be measured by using measured data obtained at present by an antenna mounted to the radar apparatus and measured data obtained for a relative positional relation between the target and the antenna at a time which is different by slight time $\Delta T$ from the current time as a unit data set and calculating the azimuth angle according to the time difference system.

In the embodiment described above, while it is assumed that the radar apparatus of the invention is used being mounted on the automobile, the application use is not restricted to that for the automobile. For example, it can also be used as an apparatus which is mounted to an air craft or a ship, monitors an obstacle, and conducts running control or warning.

What is claimed is:

1. A radar apparatus including a transmission antenna for transmitting transmission waves to a detection region, a pair of reception antennas disposed being opposed to each other and receiving reflection waves from a target, and a signal processing circuit having a function of processing the reception signals,
   wherein the signal processing circuit virtually doubles the number of antennas by combining a first data obtained by the pair of reception antennas and a second data obtained at a time different from that for the first data as reception signals into a unit data set, and
   wherein the signal processing circuit determines the change of intensity of the reception signals based on the unit data set and measures the position for the plurality of targets.

2. The radar apparatus according to claim 1,
   wherein the position to be measured for the plurality of targets is an azimuth angle for each of the targets.

3. The radar apparatus according to claim 1,
   wherein the signal processing circuit has:
   a function of calculating a linear sum for two reception signals-obtained by the pair of reception antennas while rotating the phase of one of them, thereby generating the direction of an azimuth angle of low antenna gain as in the form of signal processing; and
   a function of scanning the direction of the azimuth angle of low antenna gain thereby preparing a state of not receiving reflection signals from one of the plurality of targets as the detection object.

4. The radar apparatus according to claim 3,
   wherein the signal processing circuit further has:
   a function of Fourier-transforming signals obtained by the pair of reception antennas respectively and detecting a reflection signal from the target;
   a function of calculating a linear sum $XS(\theta)$ in accordance with the following formula (1) assuming the detected two reflection signals each comprising a complex number as $S_1$, and $S_2$, while rotating the phase by $\theta$ for complex number value $S_1$;

$$XS(\theta) = S_1 \cdot e^{j\theta} - S_2 \quad (1)$$

and
   a function of generating the direction of an azimuth angle of the low antenna gain by a calculating the linear sum for both of them as in the form of signal processing.

5. The radar apparatus according to claim 4,
   wherein the signal processing circuit further has:
   a function of developing a state where the phase rotation angle $\theta$ in the formula (1) coincides with one of the targets present by the number of two, thereby generating a state where the reflection signals from the two targets of an identical Doppler shift frequency are not synthesized in a case where such two targets are present as in the form of signal processing.

6. The radar apparatus according to claim 4,
   wherein the different time is a time distance $\Delta T$ suitable for obtaining data which is detected, when the angle of the azimuth direction of low antenna gain is directed to one target, as a state that the amplitude of the reflection signal $XS(\theta_B)$ from the other of the targets is substantially equal.

7. The radar apparatus according to claim 1,
   wherein the signal processing circuit has:
   a function of calculating a linear sum for two reception signals obtained by the pair of reception antennas while rotating the phase of one of them, thereby generating the direction of the azimuth angle of low antenna gain as in the form of signal processing; and
   a function of scanning the direction of the azimuth angle of low antenna gain, and judging and outputting a rotational angle of the phase where the intensity of the reception signal measured at present is identical with the intensity of the reception signal calculated from the data obtained at a time different by time $\Delta T$ as an existent angle of the target.

8. The radar apparatus according to claim 7,
   wherein the signal-processing circuit further has:
   a function of Fourier-transforming signals obtained by the pair of reception antennas respectively and detecting a reflection signal from the target;
   a function of calculating a linear sum $XS(\theta)$ in accordance with the following formula (1) assuming the detected two signals each comprising a complex number as $S_1$, and $S_2$, while rotating the phase by $\theta$ for complex number value $S_1$;

$$XS(\theta) = S_1 \cdot e^{j\theta} - S_2 \quad (1)$$

and
   a function of generating the direction of an azimuth angle of the low antenna gain by calculating the linear sum for both of them.

9. The radar apparatus according to claim 8,
   wherein the signal processing circuit develops a state where the phase rotation angle $\theta$ in the formula (1) coincides with one of the targets present by the number of two, thereby generating a state where the reflection signals from the two targets of an identical Doppler shift frequency are not synthesized as in the form of signal processing in a case where such two targets are present.

10. The radar apparatus according to claim 7,
wherein the radar apparatus is at a stationary position, and
wherein the signal processing circuit has a function of measuring the azimuth angle of the target by using measured data obtained at present and measured data obtained in the past by the time ΔT in which the positional relation between the target and the antenna of the radar apparatus is different from the positional relation at the present time.

11. The radar apparatus according to claim 1,
wherein the time distance ΔT for the different time used of the unit data set is changed in accordance with the moving velocity of the radar apparatus.

12. The radar apparatus according to claim 1,
wherein the radar apparatus moves along with lapse of time.

13. The radar apparatus according to claim 1,
wherein the radar apparatus is mounted on an automobile, and
wherein the time distance ΔT of the different time used for the unit data set is changed in accordance with the running velocity of the automobile mounting the radar apparatus and the yaw rate of the automobile.

14. A radar apparatus including an analog circuit having a generating function, transmission function and reception function of signals, and a signal processing circuit having a processing function of reception signals,
wherein the analog circuit has a transmission antenna for transmitting transmission waves to a detection region and a pair of reception antennas disposed being opposed to each other,
wherein the signal processing circuit processes the reflection wave of the received transmission waves as a reception signal and tracks the target,
wherein the signal processing circuit virtually doubles the number of antennas by combining a first data obtained by the pair of reception antennas and a second data obtained at a time different from that of the first data as reception signals into a unit data set, and
wherein the signal processing circuit measures the positions for the azimuth angles of the plurality of the targets by using the unit data set.

15. The radar apparatus according to claim 14,
wherein the signal processing circuit has:
a function of calculating a linear sum for two reception signals obtained by the pair of reception antennas while rotating the phase of one of them, thereby generating the direction of the azimuth angle of low antenna gain as in the form of signal processing; and
a function of scanning the direction of the azimuth angle of low antenna gain, and judging and outputting a rotational angle of the phase where the intensity of the reception signal measured at present is identical with the intensity of the reception signal calculated from the data obtained at a time different by time ΔT as an existent angle of the target the same.

16. The radar apparatus according to claim 15,
wherein the signal processing circuit further has:
a function of Fourier-transforming signals obtained by the pair of reception antennas respectively and detecting a reflection signal from the target;
a function of calculating a linear sum $XS(\theta)$ in accordance with the following formula (1) assuming the detected two reflection signals each comprising a complex number as $S_1$, and $S_2$, while rotating the phase by $\theta$ for complex number value $S_1$;

$$XS(\theta) = S_1 \cdot e^{j\theta} - S_2 \quad (1)$$

and
a function of developing a state where the phase rotation angle $\theta$ in the formula (1) coincides with one of the targets present by the number of two, thereby generating a state where the reflection signals from the two targets of an identical Doppler shift frequency are present as in the form of signal processing in a case where such two targets are present.

17. The radar apparatus according to claim 14,
wherein the signal processing circuit includes a target position calculation section,
wherein the target position calculation section includes a relative velocity calculation unit and a distance calculation unit for calculating the relative velocity and the distance of the target, a time difference setting unit for defining the different time, a target number judging unit for judging the number of the targets, and a time difference system azimuth angle calculation unit for calculating the azimuth angle,
wherein the time difference system azimuth angle calculation unit includes a null-point scanning curve calculation section, a null-point scanning curve comparison section, and a null-point scanning curve memory section,
wherein the null-point scanning curve calculation section has a function of calculating null-point scanning curves,
wherein the null-point scanning curve comparison section has a function of determining intersections of the two null-point canning curves as the azimuth angles of the targets, and
wherein the null-point scanning curve memory section has a function of possessing information regarding the null-points.

18. The radar apparatus according to claim 14,
wherein the signal processing circuit includes a target position calculation section,
wherein the target position calculation section includes a relative velocity calculation unit and a distance calculation unit for calculating the relative velocity and the distance of the target, a time difference setting unit for defining the different time, a target number judging unit, a time difference system azimuth angle calculation unit for calculating the azimuth angle in a case where the targets are present in plurality and a mono-pulse system azimuth angle calculation unit for calculating the azimuth angle in a case where the target is present by the number of one, and
wherein the target number judging unit has a function of judging the number of targets from the processed data of reflection signals, and judging that whether the processing for the azimuth angle calculation should be conducted either by the time difference system azimuth angle calculation unit or by the mono-pulse system azimuth angle calculation unit.

19. A method of measuring an azimuth angle of a tangent in a radar apparatus including a transmission antenna, a pair of reception antennas disposed being opposed to each other, and a signal processing circuit having a function of processing reception signals, the method comprising the steps of:
transmitting transmission waves from the one transmission antenna to a detection region;
receiving the reflection waves of the transmission waves by the pair of reception antennas disposed being opposed to each other;

combining a first data obtained by the pair of reception antennas and a second data obtained at a time different from the first data as a unit data set of reception signals; and determining the change of intensity of the reception signals from the unit data set and measuring the position for the azimuth angle of the plurality of targets.

20. The method of measuring an azimuth angle of a target according to claim 19, the method further comprising the steps of:

calculating a linear sum for two reception signals obtained by the pair of reception antennas while rotating the phase of one of them, thereby generating the direction of an azimuth angle of low antenna gain as in the form of signal processing; and scanning the direction of the azimuth angle of low antenna gain, and judging and outputting the rotational angle of the phase where the intensity of the reception signal measured at present is identical with the intensity of the reception signal calculated from data obtained at a time different by time $\Delta T$ as an existent angle of the target.

* * * * *